Figure 4:
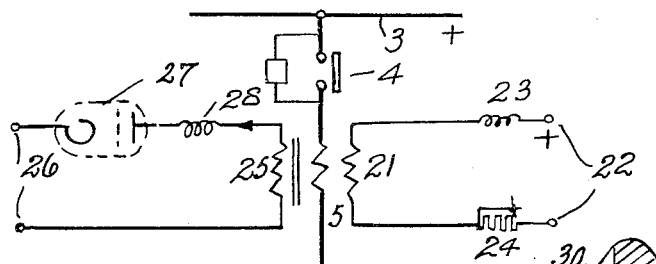

Jan. 8, 1957 J. C. READ ET AL 2,777,108
ELECTRIC CURRENT RECTIFIERS
Filed Oct. 18, 1952 2 Sheets-Sheet 1
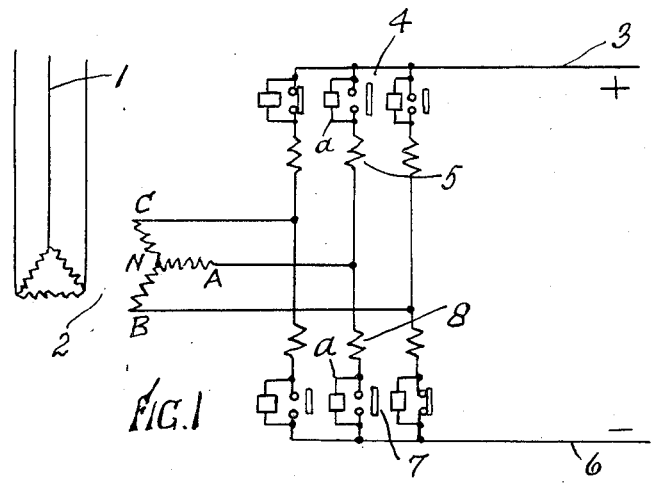
FIG.1
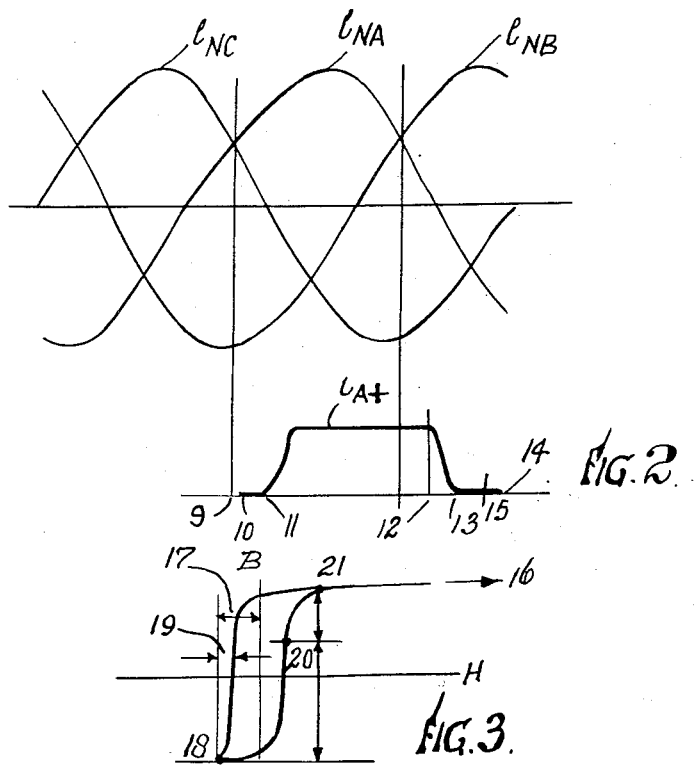
FIG.2
FIG.3
Inventors
John C. Read,
Derek R. Smith;
by Gilbert P. Tarleton
Their Attorney Inventors
John C. Read,
Derek R. Smith;
by Gilbert P. Tarleton
Their Attorney United States Patent Office 2,777,108
Patented Jan. 8, 1957

2,777,108

ELECTRIC CURRENT RECTIFIERS

John C. Read, Inwoods, Rugby, and Derek R. Smith, Rugby, England, assignors to The British Thomson-Houston Company Limited, a British company Application October 18, 1952, Serial No. 315,468

Claims priority, application Great Britain November 12, 1951

3 Claims. (Cl. 321—48)

This invention relates to electric current rectifiers of the type known as contact recifiers, in which rectification is effected by the synchronous opening and closing of mechanical contacts, which open and close practically without current or voltage due to the presence of special commutating reactors and other apparatus in the circuit. More particularly the invention relates to improved means for premagnetising these reactors so as to enable the same reactor to supply volt-seconds for maintaining current flow near zero during both the opening step and the closing step of the contact, or the width of the closing step to be made adjustable i. e., maintain the current flow near zero for an adjustable interval after the contact closes.

The invention will be understood by reference to the accompanying drawings in which Fig. 1 shows the main connections of a typical contact rectifier equipment. The A. C. system 1 is connected through a transformer 2 to the D. C. system through synchronous circuit closing and opening contacts with the special commutating reactors connected in series therewith. For example, secondary terminal A of the transformer is connected to the positive terminal 3 of the D. C. system through a synchronously-operating contact 4 and commutating reactor 5, and it is connected through similar items 7 and 8 respectively to the negative terminal 6 of the D. C. system. Figure 2 shows the rectifier voltage and current waveforms useful in understanding the principle of operation. At instant 9 the voltage of terminal A first becomes higher than that of the preceding phase. At 10, contact 4 closes. During the closing step from 10 to 11, the current is held at a very low value by reactor 5. At 11, the current starts growing to its full value $i_{A+}$, by commutation from the preceding phase. At 12, which is 120 electrical degrees after 11, the current starts decreasing due to commutation to the next phase. From 13 to 14, which is known as the opening step, the current is held at a very low positive value; and at 15, about midway in the opening step, contact 4 opens. Bypass circuits, of which various forms are known, are provided as shown in Fig. 1 at a effectively in parallel with the contacts, so that the voltage that appears across the contacts when they open is small.

The desired magnetisation conditions for a typical commutating reactor such as 5 are shown in Fig. 3. When the main current is flowing this is totally saturated to a point 16. When the current decreases toward zero, the reactor, which is premagnetised from a separate source by the amount shown at 17, undergoes a flux change to point 18, which produces the opening step. The resulting current which has to be broken by the contacts when these open, or absorbed in the bypass circuit, is shown typically at 19. During the time that the contacts are open the reactor is remagnetized from a separate source to a fresh point such as 20. The subsequent flux change from 20 to 21 produces the closing step.

The designability of what has so far been described in connection with Figs. 1, 2 and 3 is already known.

It is the object of the present invention to provide a cooperating combination of means for premagnetizing the commutating reactor by the amount 17 in readiness for contact opening, and to premagnetise it to the adjustable point 20 in readiness for contact closing.

A specific object is to render the full volt-seconds of the reactor effective for maintaining current flow near zero while the contact opens and to enable a definite and adjustable part of the full volt-seconds of the reactor to be effective to maintain current flow near zero when the contact closes and for an adjustable interval thereafter.

According to the invention, the commutating reactor is premagnetised while the contact is closed with a constant but adjustable premagnetising current fed from a D. C. source, for contact opening and this D. C. premagnetisation is periodically overbalanced while the contact is open by a pulse of current from an A. C. source, which applies a predetermined and adjustable amount of volt-seconds to the reactor so as to remagnetise it from point 18 to point 20, for maintaining the current near zero upon contact closing and for an adjustable interval thereafter.

Fig. 4 (in which for the sake of clearness only one phase is illustrated) shows one form of the invention. The commutating reactor 5 has, in addition to its main current winding, two premagnetising windings. One of these, 21, is fed from a D. C. source 22 through a high inductance 23 and adjustable rheostat 24, and this provides the D. C. premagnetisation for contact opening which is shown at 17 in Fig. 3; the corresponding D. C. premagnetising windings of the other commutating reactors may also be connected in series in this circuit. The A. C. premagnetising winding 25 is fed from an A. C. source 26, through a thyratron 27 or its equivalent, and a reactor 28.

Figure 5:
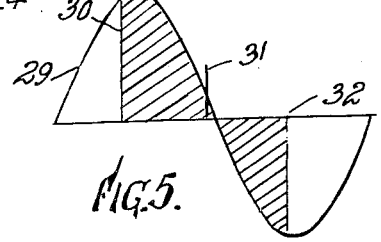

Fig. 5 shows the voltage wave useful in understanding the principle of operation of this circuit. The sine wave 29 represents the voltage of the A. C. source 26. The thyratron is controlled by its grid so that it fires at instant 30. Contacts 4 close at instant 31; and the synchronization of the phase of voltage 29 is made such that the instant of contact closure is close to, and preferably slightly in advance of the zero instant of the voltage wave as shown. The shaded area between 30 and 31 thus represents the volt-seconds applied to 28 and 25, and this definite amount of volt-seconds thus produces the required remagnetisation of reactor 5 from 18 to 20 (Fig. 3) at the time of contact closure. At 32, the current in 25 reaches zero again, and the thyratron grid regains control. The thyratron serves two purposes; it prevents the opening step from inducing current in 25, since 32 occurs well before the beginning of the opening step and the thyratron grid is then able to prevent current from flowing; and by adjustment of the position of instant 30 it provides a convenient means for adjusting the position of point 20, i. e. adjusting the width of the closing step. The function of reactor 28 is to prevent the closing-step voltage from inducing too large a rate of change of current in 25.

Figure 6:
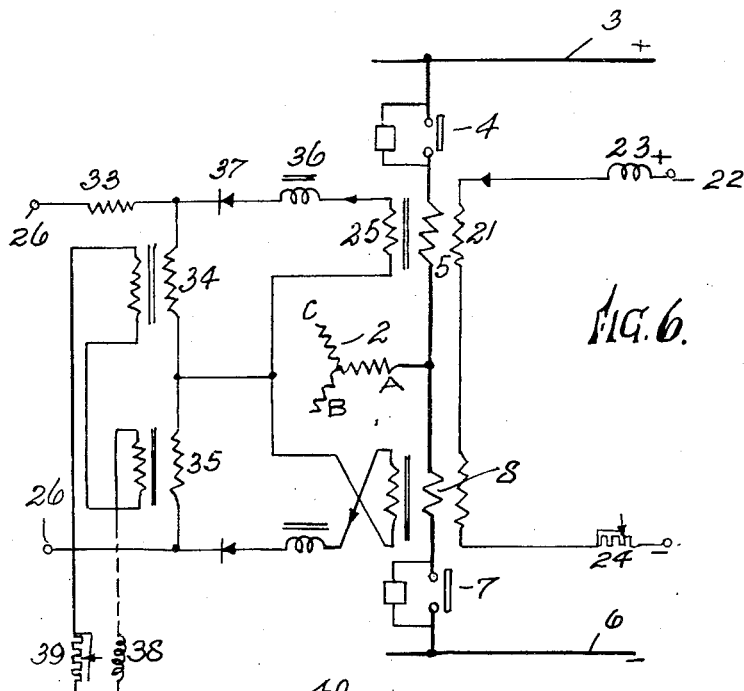
Figure 7:
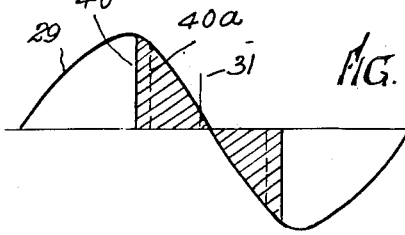

Figs. 6 (in which for the sake of clearness only two opposite phases are shown) and Fig. 7 illustrate an alternative arrangement according to the invention. The D. C. premagnetisation of the commutating reactors is effected in the same way as in Fig. 4. The auxiliary A. C. source 26 has connected across it a linear reactor 33 and two highly saturable reactors 34 and 35 which are equally and oppositely premagnetised with D. C. The A. C. premagnetising windings 25 of commutator reactor 5 is connected across reactor 34, and has also a reactor 36 in series with it, which is preferably also of the highly saturable type. The product of turns x saturation flux for 36 is made greater than the corresponding product for 25, and the number of turns in 36 is much greater than the number of turns in 25. A rectifying element 37 may also be connected in series with 25 and 36. The A. C. premagnetisation of commutating reactor 8, whose operation is 180 degrees out of phase with that of 5, is similarly provided in parallel with 35. The D. C. premagnetising windings of 34 and 35 are supplied from a D. C. source such as 22 through a large inductance 38 and rheostat 39; and the presaturating windings on the corresponding reactors for the other phases of the equipment may also be connected in series.

The operation of this circuit in providing A. C. premagnetisation of commutating reactor 5 is illustrated in Fig. 7. As is well known, the application of suitable D. C. premagnetisation to chokes 34 and 35 with reactor 33 in series results in producing a voltage across 34 whose open-circuit wave-form is as shown shaded in Fig. 7. The wave front 40 of this voltage can be advanced or retarded, e. g. to 40a, by adjustment of the D. C. premagnetising ampere turns on 34 and 35. As before, the synchronization is such that contacts 4 close at 31.

The opening-step voltage in 25 is resisted by flux change in 36, so that the current thus induced in 25 is small. The volt-seconds applied to 36 and 25 by 34 prior to contact closure, i. e. the shaded area between 40 and 31, complete the magnetisation of 36 up to saturation, and apply a definite and adjustable amount of volt-seconds to 25. In this way, as in Fig. 4, the volt-seconds applied to winding 25 remagnetise commutating reactor 5 from point 18 to point 20 by the time the contacts close; and by adjusting the D. C. premagnetisation on 34 and 35 the wave front 40 is shifted, thus point 20 is shifted, and thus the width of the closing step is adjusted. The rate of change of current in 25 produced by the closing step (when reactor 36 is totally saturated) is held within permissible limits by reactor 33, which also serves to prevent excessive current flowing through 34 and 35 during that part of the cycle when 34 and 35 are both saturated.

Although the invention has been described with respect to rectifier operation it is also applicable to inverter operation, the conditions for obtaining which are well known.

What we claim as new and desire to secure by Letters Patent of the United States of America is:

1. In combination, alternating current rectifying apparatus having means including a synchronous circuit closing and opening contact for rectifying the current, a saturable reactor having a winding connected in series with the contact for saturating the reactor in one direction while the contact is conducting rectified current above a relatively low value and provided with pre-magnetizing means effective in the opposite direction for substantially oppositely saturating the reactor when the rectified current decreases toward zero to thereby enable the reactor winding in series with the contact to supply volt-seconds for temporarily maintaining the current flow through the contact near zero while the contact opens, and synchronized alternating current pulsing adjustable magnetizing means for applying a predetermined and adjustable amount of volt-seconds periodically in the said one direction sufficient to overbalance the reactor pre-magnetizing means and change the flux of the reactor a definite and adjustable amount in the same direction as the rectified current-carrying winding while the contact is open and thereby enable the reactor to supply a definite and adjustable amount of volt-seconds for maintaining the current flow through the contact near zero while the contact closes and for an adjustable period thereafter.

2. In combination, alternating current rectifying apparatus having means including a synchronized circuit closing and opening contact for rectifying the current, a saturable reactor having means including an adjustable direct current circuit for pre-magnetizing the reactor to effect saturation thereof in one direction and provided with a winding connected in series with the contact for oppositely saturating the reactor while the contact is conducting rectified current above a relatively low value to thereby enable the reactor to supply volt-seconds for temporarily maintaining the current flow through the contact near zero while the contact opens, and synchronized alternating current pulsing adjustable magnetizing means for applying a predetermined and adjustable amount of volt-seconds periodically in the said one direction sufficient to overbalance the reactor pre-magnetizing means and change the flux of the reactor a definite and adjustable amount in the same direction as the rectified current-carrying winding while the contact is open and thereby enable the reactor to supply a definite and adjustable amount of volt-seconds for maintaining the current flow through the contact near zero while the contact closes and for an adjustable period thereafter.

3. In combination, alternating current rectifying apparatus having means including a synchronized circuit closing and opening contact for rectifying the current, a saturable commutating reactor having a winding connected in series with the contact for saturating the reactor in one direction when the rectified current exceeds a relatively low value and provided with a pair of separately energizable magnetization control windings, an adjustable direct current circuit including one of said control windings for pre-magnetizing the reactor in the opposite direction while the contact is closed to effect opposite saturation thereof when the rectified current decreases toward zero to thereby enable the reactor winding in series with the contact to supply volt-seconds for maintaining the current flow through the contact near zero while the contact opens, and synchronized alternating current pulsing adjustable magnetizing means for applying a predetermined and adjustable amount of volt-seconds to the other control winding of the reactor periodically in the said one direction sufficient to overbalance the reactor pre-magnetizing action of the one control winding and change the flux of the reactor a definite and adjustable amount in the same direction as the rectifying current-carrying winding while the contact is open and thereby enable the reactor to supply a definite and adjustable amount of volt-seconds for maintaining the current flow through the contact near zero while the contact closes and for an adjustable period thereafter.

References Cited in the file of this patent

UNITED STATES PATENTS

| | | |
|---|---|---|
| 2,466,864 | Prati | Apr. 12, 1949 |
| 2,584,535 | Belamin | Feb. 5, 1952 |

FOREIGN PATENTS

| | | |
|---|---|---|
| 113,439 | Sweden | Mar. 13, 1945 |
| 233,456 | Switzerland | Jan. 3, 1945 |
| 506,015 | Great Britain | May 22, 1939 |